United States Patent [19]
Cioni et al.

[11] 3,907,096
[45] Sept. 23, 1975

[54] VIALS FEED DEVICE ALONG AN INCLINED PLANE FOR VIALS HANDLING MACHINES

[76] Inventors: Elisabetta Cioni; Lucia Cioni; Rovena Anichini Cioni, widow, all of Via di Marciano 22, Siena, Italy

[22] Filed: Jan. 24, 1974

[21] Appl. No.: 436,390

[30] Foreign Application Priority Data
Jan. 29, 1973  Italy.................................. 9317/73

[52] U.S. Cl............,........................... 198/30; 198/219
[51] Int. Cl.²......................................... B65G 47/28
[58] Field of Search............................. 198/30, 219

[56] References Cited
UNITED STATES PATENTS

| | | | |
|---|---|---|---|
| 2,497,768 | 2/1950 | Hallead.............................. | 198/219 |
| 3,139,176 | 6/1964 | Bliss............................ | 198/30 UX |
| 3,708,053 | 1/1973 | Anderson........................... | 198/219 |
| 3,716,127 | 2/1973 | Loeffler................. | 198/30 |
| 3,792,768 | 2/1974 | Cheeseman.......................... | 198/30 |
| 3,815,726 | 6/1974 | Klein................... | 198/219 |

*Primary Examiner*—Evon C. Blunk
*Assistant Examiner*—Jeffrey V. Nase
*Attorney, Agent, or Firm*—McGlew and Tuttle

[57] ABSTRACT

The inclined plane is formed by a first fixed grid and a second movable grid. Each grid comprises elongated bars extending in the vial feeding direction and spaced laterally from each other, with the bars of the second grid alternating with the bars of the first grid. At the lower end of the inclined plane, there are provided delivery members which separate the advancing mass of vials into regular rows for transfer into a conveying means supplying the vials to a vial handling machine. The second grid has imparted thereto a cyclical motion with two trajectories. In the zone nearest to the vial separating members, the second grid follows a trajectory which is substantially linear in the vial feeding direction while, in the zone farthest from the separating members, the trajectory has an annular and substantially elliptical form. Thereby, the second grid performs a cyclical lifting of the vials from the first fixed grid with an advance of the lifted vials in the feeding direction relative to the first fixed grid. The device is particularly useful for vial handling machines in pharmaceutical industries.

1 Claim, 2 Drawing Figures

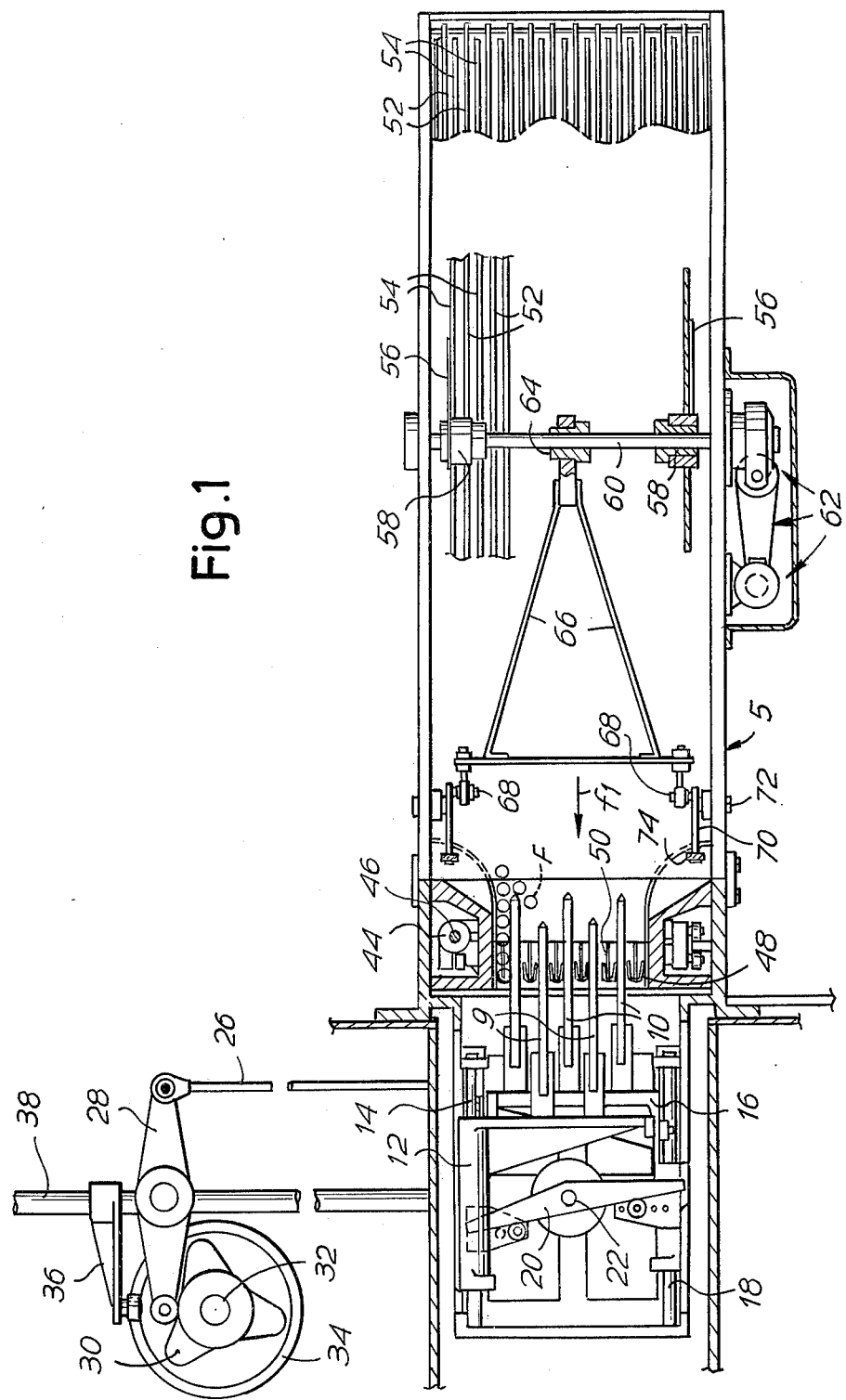

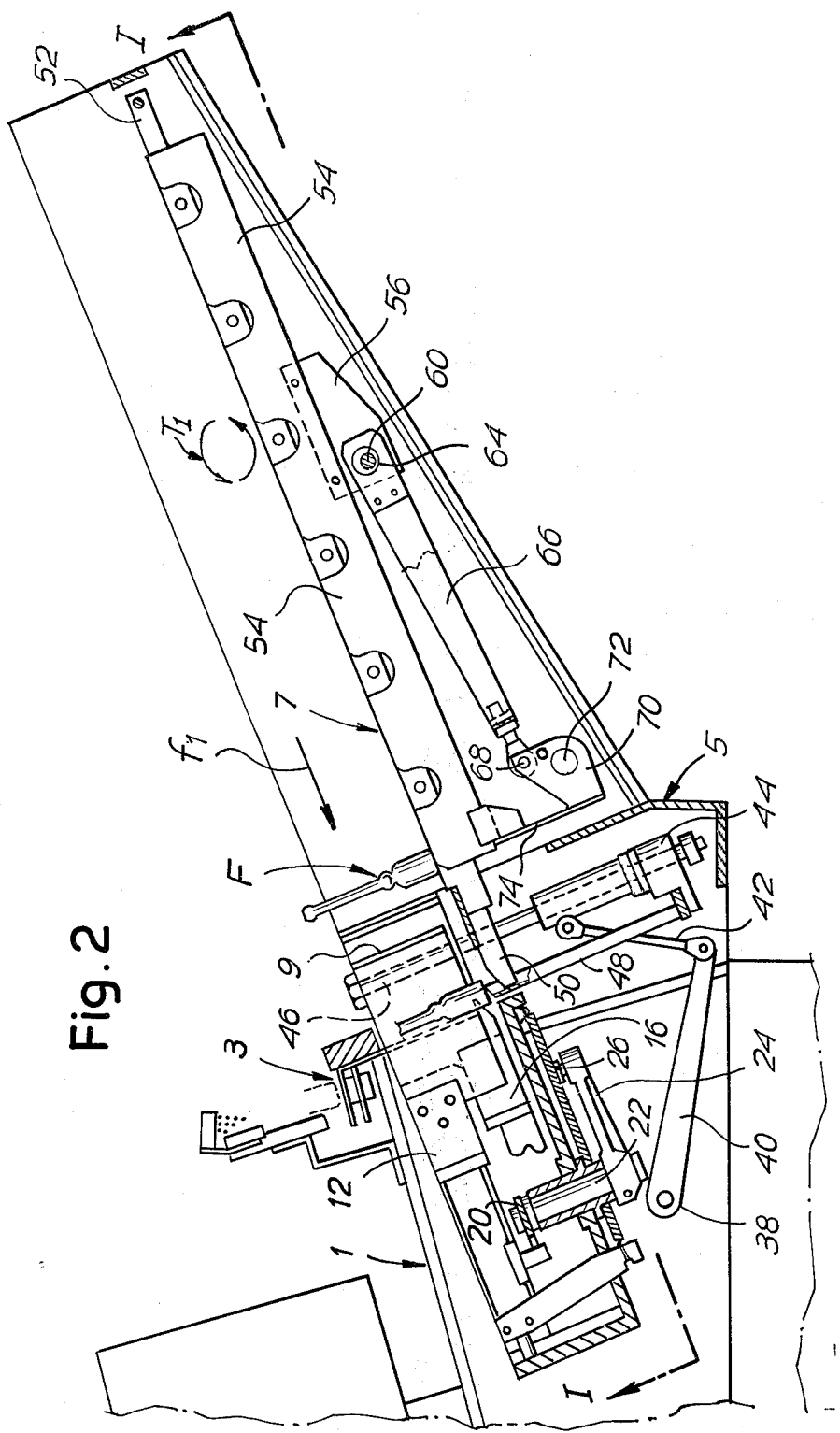

VIALS FEED DEVICE ALONG AN INCLINED PLANE FOR VIALS HANDLING MACHINES

The invention relates to a device designed to advance or feed vials or similar objects (for instance bottles) arranged side by side and designed to slide regularly downwardly along an inclined slope and supporting one another. A device of this kind is advantageously applied to feed the vials with regularity into vials handling machines, such as the machines washing the vials and the like. The device may include — in a manner already per se known — members forming racks and cyclically movable to penetrate into the mass of the vials advancing along the inclined plane, so as to forward them in regular rows for the subsequent transfer to the transport means of the machine designed to receive the vials.

SUMMARY OF THE INVENTION

The invention relates to a device designed to assure the feed of the mass or of the vials arranged side by side and supporting one another. According to the invention, the sliding surface of the vials assembly includes a first fixed grid with rods extending in the motion or advancing direction of the vials assembly, and a second rod grid interposed between the rods of the first grid, the second grid accomplishing a cyclical motion with trajectories which, in the zone nearest to the vials delivery members, are almost linear in the feed direction while, in the zone farthest from the delivery members, the trajectories are annular in order to provide a cyclical lifting of the vials with respect to the fixed grid.

In practice, in the zone farthest from the vials delivery members, the motion of the second grid is determined by eccentric means designed to impose a substantially circular trajectory. In the zone next to the zone of the vials delivery members, the second grid has a reciprocal motion imparted by an oscillatory member which may be actuated by the eccentric means and which transmits the motion to the second grid through elastic members, such as elastic blades.

The reciprocating motion of the second grid in the zone next to the delivery or separating members advantageously is shifted angularly with respect to the annular movement of the second grid in the zone farthest from the delivery or separating members, in such a manner so as to obtain a feed or advance of the vials while the zone of the second grid farthest from the members is following the upper arc of its substantially elliptical annular trajectory provided by the eccentric means.

BRIEF DESCRIPTION OF THE DRAWINGS

The accompanying drawing illustrates a not restricting embodiment of a feed device with the attachment according to the invention. In the drawing:

FIG. 1 is a schematic view, of the device with some parts removed and other ones sectioned, seen from below according to the line I—I of FIG. 2; and FIG. 2 is a longitudinal section of the device.

DESCRIPTION OF THE PREFERRED EMBODIMENT

According to the accompanying drawing, 1 denotes generically a machine to which the vials are to be regularly fed. In particular, the vials must be fed to an endless conveyor 3 provided with seats therefor, the seats being longitudinally spaced according to a predetermined pitch and the conveyor being advanced by steps with a pitch which is a multiple of a pitch between the seats for the vials. The machine 1 may, for instance, be a vial handling machine for the filling of the vials. 5 generically denotes a device for the vials feed, which is provided with the advance device according to the invention. The device includes a surface 7 (defined by two grids to be subsequently described), which surface is inclined downwardly and towards the machine 1, so that the vials F are advanced therealong according to the arrow $f_1$, the vials being located side by side and supported by one another. The vials are arranged in rows parallel to their feed direction indicated by the arrows $f_1$. To this end, there are provided two units or groups of laminar members 9 and 10 vertically arranged, alternately with one another and each spaced from the adjacent one, by an amount corresponding to the diametral dimension of the vial body. The laminar members 9 of a first group are borne by a slide unit 12 sliding on ways 14. The laminar members 10 of the second unit are borne by a unit 16 sliding on ways 18. The two units 12 and 16 are reciprocated in phase opposition to each other by a balance or rocker arm member 20 linked or pivoted to a shaft 22. An arm 24, oscillated by a rod 26, through a rocker 28 actuated by a cam 30, is integral with shaft 22. The cam 30 is borne by a shaft 32, which is continually rotated and with which also a front cam 34 is integral. Cam 34 acts on the tappet of an arm 36, which is mounted on a shaft 38. At least one arm 40 which, through a respective crank link 42, operates a slide 44 slidable along ways 46 orthogonal to the inclined surface 7, is integral with shaft 38. The slide 44 bears lifting stems 48 for the vials, that is those in the first row of the rows included between the laminar members 9 and 10. In this way, the vials may be lifted and transferred — in an already per se known manner — into the seats of the conveyor 3. It is to be noted that the vials of the rows included between the laminar members 9 and 10 before the lifting rest on rods 50 arranged substantially centrally in the inter-spaces between the adjacent laminar members 9 and 10. The reciprocating motion of the laminar members of both groups 9 and 10, which alternate in position and which are shifted in opposition in actuation, determines a regular flow and a regular settling of the assembly of the vials F in rows flanking laminar members 9 and 10. This arrangement is per se already known.

The invention relates to a device to advance the vials unit F along an inclined surface 7 in such a manner as to make the flow and the settling of the vials regular towards the wedge-like ends of the laminar members 9 and 10. This is of essential importance to allow a regular operation of the feed device and consequently a regular operation of the machine to which the vials are to be fed, which is reflected in the entire production cycle.

In order to accomplish this, there is provided a first grid formed by a plurality of rods or sticks 52 fixed and oriented according to the direction of the arrows $f_1$ and thus according to the line of the maximum slope of the surface 7 which is defined by this grid. Between the rods 52 of the first grid are interposed rods 54 of a second grid which is movable with a particular cyclical motion law, so as to assure the aforesaid regular feed of the vials resting on the surface 7, which is after all formed by the fixed rods grid 52 and by the movable rods grid 54 to set up an advance or feed generically similar to that of a so-called "pilgrim pitch or pace," but modified according to the requirements of the specific application.

The rods 54 at a position spaced substantially from the members 9 and 10, are borne by a supporting group 56 which is provided with an eccentric motion, as it is supported through eccentric means 58 by a rotary shaft 60, rotated by a motor-reducer unit 62. Shaft 60, through a second eccentric 64, operates a triangular crank 66. Eccentric 64 is arranged with the orientation of its own eccentricity substantially orthogonal to that of the eccentric of the supporting unit 56. The triangular crank 66 is linked at 68 to a pair of members 70 which are pivoted at 72 to the fixed frame of the device 5, adjacent the working zone of the laminar members 9 and 10. Two elastic blades or sheets 74 are engaged with members 70, these blades being substantially orthogonal to the lying or lay of the surface 7 and fixed into the grid formed by the rods 54 towards the end thereof which is adjacent the laminar members 9–10.

By this arrangement, a particular cyclical motion, of the movable grid formed by the rods 54, is determined, which grid, in the zone farthest from the members 9–10, has a trajectory which is substantially circular but slightly elongated in the direction of the arrows $f_1$ (as it is generically and demonstratively shown by the annular line $T_1$), while in the zone next the members 9–10, and thus lower, the cyclical trajectory of the rods 54 is substantially rectilinear and parallel to the upper lying surface of the rods 52. This is due to the fact that the eccentric means 58 act directly on the grid of the rods 54, while the alternative motion at the ends of said rods adjacent the members 9–10 is imposed by the members 70 and by the elastic blades 74 which tend to bend in order to compensate the variations of motion between the rods 54 and the oscillatory members 70.

The vials feed or advance therefore is efficient and positive but, on the other hand, the vials are kept in a regular array and are not disturbed by jerking motions in the zone wherein the laminar members 9–10 must act like wedges in a cyclical manner within the mass of the vials.

While a specific embodiment of the invention has been shown and described in detail to illustrate the application of the principles of the invention, it will be understood that the invention may be embodied otherwise without departing from such principles.

What is claimed is:

1. A device for supplying vials and the like to a vial handling machine, having a conveying means for receiving the vials and the like and conveying the same to the machine, by sliding a mass of vials and the like in a feeding direction along a support surface toward the conveying means and, in advance of the conveying means, separating the advancing mass of vials and the like into regular rows for transfer thereof to the conveying means, said device comprising, in combination, inclined grid means forming said support surface and including a first fixed grid of laterally spaced first rods elongated in said feeding direction and a second grid of laterally spaced second rods elongated in said feeding direction and interposed between said first rods; separating means at the lower end of said inclined grid means and interposed between said inclined grid means and said conveying means; said separating means including rack members facing toward said inclined grid means and means operable to cyclically reciprocate said rack members to penetrate into the mass of vials advancing along said inclined grid means to separate the mass of vials into regular rows for subsequent transfer to said conveying means; and control means operatively associated with said second grid and operable to effect a cyclical motion of said second grid having a substantially linear trajectory, in said feeding direction, in a first zone of said second grid adjacent said rack members, and having an annular trajectory, in a vertical plane, in a second zone of said second grid spaced substantially from said rack members to obtain a cyclical lifting of the vials and the like from said first rods of said first fixed grid and a cyclical movement of the vials and the like toward said rack members; said control means including, in said second zone, eccentric means operable to impart, to said second grid in said second zone, a substantially circular trajectory having an upper arc extending toward said rack members and a lower arc extending away from said rack members; said control means including, in said first zone, an oscillatory member and elastic blade members connecting said oscillatory member to said second grid in said first zone; said control means further including connecting rod means operable by said eccentric means and connected to said oscillatory member; said eccentric means operating said connecting rod means to advance said second grid toward said rack members in said first zone while said second grid, in said second zone, is operated by said eccentric means to travel along the upper arc of said substantially circular trajectory.

* * * * *